United States Patent Office 2,973,180
Patented Feb. 28, 1961

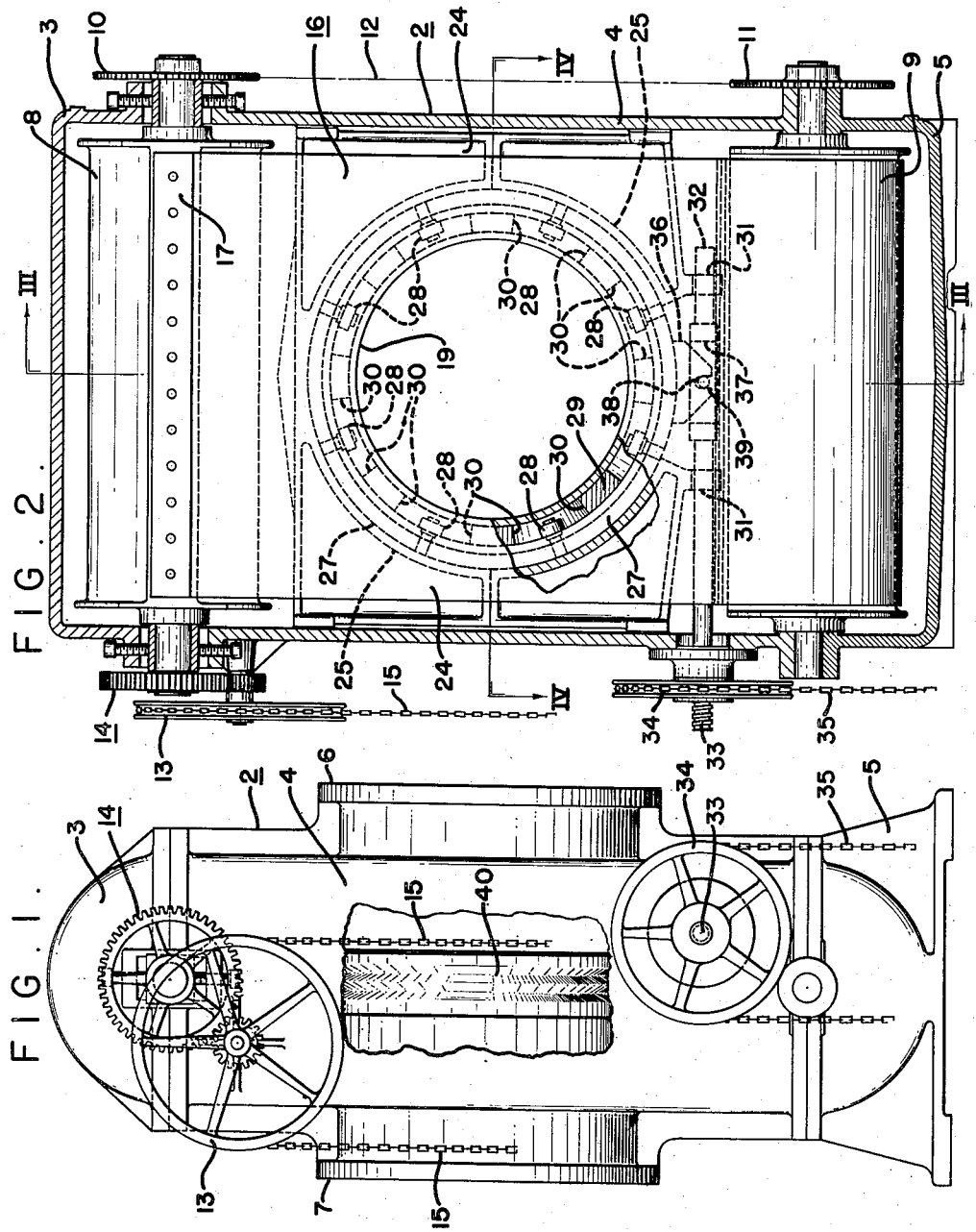

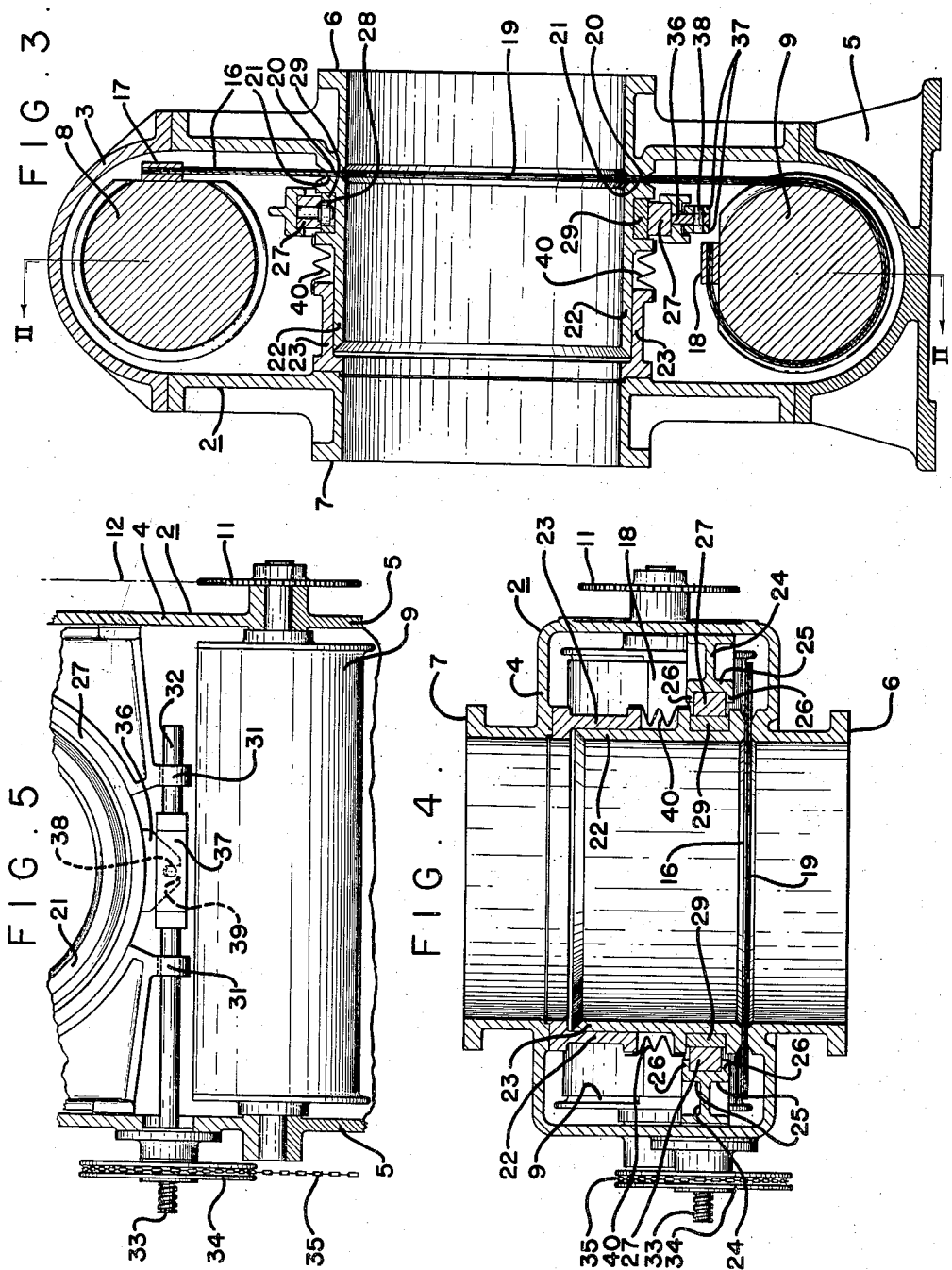

2,973,180

VALVE

Sidney T. Morgan, O'Hara Township, Allegheny County, Pa., assignor to Salem-Brosius, Inc., Carnegie, Pa., a corporation of Pennsylvania Filed May 13, 1957, Ser. No. 658,560

11 Claims. (Cl. 251—170)

This invention relates to a valve and particularly a valve for controlling flow through a conduit. My valve is especially well adapted for employment with conduits of large size, for example, several feet in diameter, to take the place of a goggle valve, although it is also adapted for use in place of a gate valve.

My valve is of a unique type, taking up relatively little space as compared with a goggle valve for performing the same duty yet being highly effective, easy to operate and inexpensive to manufacture. One of its advantages over a goggle valve is that when a closed casing is desired to inhibit leakage while the valve element is being shifted between open and closed positions it is not necessary to build onto the valve casing a lateral projection which is necessary for receiving the swinging goggle plate in a goggle valve.

My valve preferably comprises a flexible sheet-like valve element having a portion with an opening therein adapted to be aligned with a conduit to permit flow through the conduit and another portion adapted to be aligned with the conduit to inhibit flow through the conduit. I provide means for moving the valve element between positions in which said respective portions thereof are aligned with the conduit and in so doing rolling up a portion of the valve element out of alignment with the conduit. Sealing means may be provided which are connected with the conduit and adapted to engage the valve element at the opposite faces thereof.

I preferably provide drums at opposite sides of the conduit on which the valve element is adapted to be rolled up whereby the valve element is moved between positions in which the above mentioned respective portions thereof are aligned with the conduit. The valve element is preferably elongated in the direction of its movement between said positions and preferably comprises a plurality of layers of material fastened together only at the ends thereof. I preferably provide for the paths of movement of the layers during movement of the valve element between the aforementioned positions to be such as to obviate any substantial tendency to stretch any layer relatively to any other layer. The layers of the valve element may be of sheet metal. At present I prefer to make the layers of the valve element of stainless steel.

I preferably provide means for turning synchronously in the same direction the drums on which the valve element is rolled up. The drums may be turned in either direction so that when the valve is open it may be moved to closed position by turning the drums in one direction and when the valve is closed it may be moved to open position by turning the drums in the opposite direction. The drums are preferably of such diameter that the valve element at no time extends about either drum a peripheral distance equal to the circumference of the drum.

I preferably provide a sleeve mounted for movement into and out of contact with the valve element together with a ring surrounding the sleeve, means including cam means acting between the ring and the sleeve upon turning of the ring to press the sleeve into firm contact with the valve element and means for turning the ring.

When my valve is used in places where leakage during the time when the valve element is being moved between open and closed positions is of no consequence the valve casing may be an open or skeleton type casing permitting the leakage to escape to the atmosphere. When, however, the escape of leakage to the atmosphere would be undesirable I utilize a valve casing which is closed except for the connections with the conduit. Thus any fluid escaping from the conduit while the valve is being moved between open and closed positions is confined within the casing and the valve acts in the nature of a gate valve.

The valve element of my valve may be positioned relatively adjacent one of the connections between the valve casing and the conduit and a sleeve may be mounted for movement into and out of contact with the valve element, peripherally closed guide means for the sleeve being carried by the other of the connections between the valve casing and the conduit and flexible sealing means being provided which extend between the sleeve and the guide means and inhibit leakage therebetween. Such flexible sealing means are preferably utilized when an open type casing is employed to inhibit leakage from the conduit about the sleeve which would otherwise escape to the atmosphere.

Other details, objects and advantages of the invention will become apparent as the following description of a present preferred embodiment thereof proceeds.

In the accompanying drawings I have shown a present preferred embodiment of the invention in which:

Figure 1 is a side elevational view of a valve with a portion of the casing cut away to show the internal structure;

Figure 2 is a vertical transverse cross-sectional view through the valve taken on the line II—II of Figure 3 and with a portion of the valve element cut away;

Figure 3 is a vertical longitudinal cross-sectional view through the valve taken on the line III—III of Figure 2;

Figure 4 is a horizontal cross-sectional view through the valve taken on the line IV—IV of Figure 2; and Figure 5 is a fragmentary vertical transverse cross-sectional view of the valve but with the valve element omitted.

Referring now more particularly to the drawings, the valve casing is designated generally by reference numeral 2 and comprises top, intermediate and bottom sections 3, 4 and 5 respectively which are fastened together in any suitable manner, as, for example, by bolting, with gaskets or other sealing means between the sections. The casing shown is of the closed type which will inhibit escape to the atmosphere during the time when the valve element is being moved between open and closed positions of fluid from the conduit whose flow is being controlled by the valve. If an open type casing is desired, for use when escape of fluid to the atmosphere while the valve element is being moved between open and closed positions is not undesirable, openings may be provided in the casing to reduce its weight and cost. Either an open type or a closed type casing may be provided at the bottom with a drainage opening, which opening in a closed type casing may be closed by a removable plug.

The intermediate section 4 of the casing 2 has connecting portions 6 and 7 through which the valve is adapted to be connected with a conduit. While the valve might be employed at a terminus of a conduit to act as a vent valve it will normally be used intermediate the ends of a conduit to selectively permit and inhibit flow through the conduit, generally of gas. An example use to which the valve may be put is the control of the flow of hot air or hot gas in steel plants, for example, in connection with blast furnaces.

The valve has an upper drum 8 and a lower drum 9. Each of the drums 8 and 9 is journaled in the casing as clearly shown in Figure 2. The shaft of the upper drum 8 has a sprocket 10 fixed thereto and the shaft of the lower drum 9 has a sprocket 11 fixed thereto. A sprocket chain 12 is trained about the sprockets 10 and 11. The drums 8 and 9 are of the same diameter and the sprockets 10 and 11 are of the same diameter. The sprocket chain 12 insures that the drums will always turn synchronously in the same direction, i.e., that when one drum is turned through a given angle in a particular direction the other drum will be simultaneously turned through the same angle in the same direction.

The upper drum 8 is turned by a chain sheave 13 connected with the shaft of the drum by gearing designated generally by reference numeral 14. The sheave 13 may be turned in either direction by pulling a hand chain 15. This turns the two drums 8 and 9 simultaneously in the same direction because of their connection through the sprockets 10 and 11 and the sprocket chain 12.

The valve element is designated generally by reference numeral 16. It comprises a plurality of layers of material elongated in the vertical direction viewing Figures 1, 2 and 3 fastened together only at the ends thereof. The several layers of material are fastened together and clamped to the upper drum 8 by fastening and clamping means 17 and are fastened together and clamped to the lower drum 9 by fastening and clamping means 18. The valve element 16 and hence the layers of material comprising that valve element are elongated in the direction of movement of the valve element, i.e., as above indicated, in the vertical direction viewing Figures 1, 2 and 3. The layers of material making up the valve element 16 are of sheet form and I prefer to employ sheet metal although conceivably plastic or suitably treated fabric might be employed. I find stainless steel to be quite satisfactory for the layers making up the valve element 16.

The valve element may comprise any suitable number of layers of material, for example, five. The layers of material intermediate the ends thereof are free to move slightly relatively to each other during movement of the valve element. The valve element 16 has therein an opening 19 adapted to be aligned with the connecting portions 6 and 7 and with the conduit connected thereto to permit flow through the conduit. The opening 19 preferably is of approximately the same diameter as the connecting portions 6 and 7 and the conduit. The valve element 16 is shown in open position in the drawings, i.e., with the opening 19 coaxial with the portions 6 and 7. At that time the valve element is in its extreme lowermost position viewing Figure 3. In that position the valve element terminates tangent to the upper drum 8 and extends 270° about the lower drum 9 as clearly shown in Figure 3. When the valve is to be moved to closed position both drums are turned counterclockwise viewing Figure 3 through an angle of 270° which moves the opening 19 upwardly above and out of communication with the conduit and the connecting portions 6 and 7 and disposes an imperforate portion of the valve element 16 across the path of fluid flow. When the valve element 16 is in its uppermost position its lower end is tangent to the lower drum 9 and its upper end is turned about the upper drum 8 through an angle of 270°. Thus the same proportion of the length of the valve element 16 and of each layer of material making up that element, i.e., a length equal to three-quarters of the circumference of each of the drums 8 and 9, is always turned about one or the other of the drums or partly about one and partly about the other. The result is that the paths of movement of the layers making up the valve element 16 during movement of the valve element between open and closed positions are such as to obviate any substantial tendency to stretch any layer relatively to any other layer. There is a slight movement of the layers relatively to one another during movement of the valve element 16 but the layers are substantially equally stressed at all times.

Sealing means are provided for engagement with the valve element 16 at both faces thereof when the valve element is in either open or closed position. The connecting portion 6 terminates in an annular sealing surface 20 adapted to bear against the valve element 16. The annular sealing surface 20 is mounted in fixed position. Cooperating with the annular sealing surface 20 but disposed at the opposite face of the valve element 16 is an annular sealing surface 21 at the extremity of a sealing sleeve 22 which is supported and slidably mounted in an annular guide 23 mounted on and coaxial with the connecting portion 7. The sleeve 22 has limited sliding movement in the horizontal direction or from right to left viewing Figure 3, being supported and guided in such movement by the guide 23.

Mounted in the casing is a support 24 carrying a substantially circular supporting and guiding member 25 having opposed radially inwardly projecting flanges 26. Mounted in the supporting and guiding member 25 and partially embraced by the flanges 26 is a ring 27 having mounted therein and inwardly projecting therefrom circumferentially spaced apart rollers 28. The sleeve 22 carries a ring 29 having openings 30 receiving the rollers 28, the generally vertical faces of the ring at such openings being formed as cams so that when the ring 27 is turned about the axis of the valve the rollers 28 will press the ring 29 and hence the sleeve 22 toward the right viewing Figure 3 and thus maintain the sleeve 22 in tight sealing relationship with the valve element 16 and the valve element 16 pressed against the annular sealing surface 20.

The support 24 has guides 31 for supporting and guiding for generally horizontal movement transversely of the axis of the valve a rod 32. The rod 32 is held against rotation in any suitable manner. The outer end of the rod 32 is formed as a worm 33 and a worm wheel 34 rotatably mounted on the casing meshes with the worm 33 and is adapted to be turned by a hand chain 35. When the hand chain 35 is pulled in one direction the worm wheel 34 through the worm 33 causes the rod 32 to move to the right viewing Figures 2 and 5 and when the hand chain 35 is pulled in the opposite direction the worm wheel 34 through the worm 33 causes the rod 32 to move to the left viewing such figures. A lug 36 projects downwardly from the bottom of the ring 27 and enters a slot between opposed side members 37 connected with or forming in effect a part of the rod 32. A cross pin 38 is mounted in the side members 37 and the lug 36 has a recess 39 embracing the cross pin 38. Thus movement of the rod 32 in either transverse direction causes through the mechanism just described turning of the ring 27.

The sealing sleeve 22 and the guide 23 are sealed to each other by flexible sealing means 40 which may be of any suitable material to inhibit leakage between the sleeve 22 and the guide 23. The sealing means 40 is annular and effectively prevents leakage between the sleeve and guide. Such sealing means has primary utility when an open type casing is employed.

The valve element 16 is shown in the drawings in open position, i.e., with its opening 19 coaxial with the conduit. The sealing surfaces 20 and 21 are shown in engagement with the valve element 16. When the valve is to be opened the hand chain 35 is operated to retract the sleeve 22 toward the left viewing Figure 3 which moves the sealing surface 21 out of contact with the valve element 16 or at least relieves pressure on the valve element between the sealing surfaces 20 and 21. Thereupon through operation of the hand chain 15 the drums 8 and 9 are synchronously turned in the counterclockwise direction viewing Figure 3 through 270°, moving the valve element 16 from open to closed position and simultaneously unrolling or unwinding the valve element 16 from the lower drum 9 and rolling or winding the valve element 16 upon the upper drum 8. When the valve element 16 has thus been moved to closed position, i.e., the position in which the imperforate portion of the valve element extends across the conduit, the sealing sleeve 22 is by operation of the hand chain moved back into sealing contact with the valve element 16. In similar manner the valve is moved from closed to open position.

While I have shown and described a present preferred embodiment of the invention it is to be distinctly understood that the invention is not limited thereto but may be otherwise variously embodied within the scope of the following claims.

I claim:

1. A valve for controlling flow through a conduit comprising a flexible sheet-like valve element having a portion with an opening therein adapted to be aligned with the conduit to permit flow through the conduit and another portion adapted to be aligned with the conduit to inhibit flow through the conduit, means for partially rolling up the valve element out of alignment with the conduit and thereby moving the valve element between positions in which said respective portions thereof are aligned with the conduit and sealing means connected with the conduit adapted to engage the valve element at the opposite faces thereof.

2. A valve for controlling flow through a conduit comprising a flexible sheet-like valve element having a portion with an opening therein adapted to be aligned with the conduit to permit flow through the conduit and another portion adapted to be aligned with the conduit to inhibit flow through the conduit, drums at opposite sides of the conduit on which the valve element is adapted to be rolled up whereby the valve element is moved between positions in which said respective portions thereof are aligned with the conduit and sealing means connected with the conduit adapted to engage the valve element at the opposite faces thereof.

3. A valve for controlling flow through a conduit comprising a flexible sheet-like valve element having a portion with an opening therein adapted to be aligned with the conduit to permit flow through the conduit and another portion adapted to be aligned with the conduit to inhibit flow through the conduit and means for partially rolling up the valve element out of alignment with the conduit and thereby moving the valve element between positions in which said respective portions thereof are aligned with the conduit, the valve element being elongated in the direction of its movement between said positions and comprising a plurality of layers of material fastened together only at the ends thereof.

4. A valve for controlling flow through a conduit comprising a flexible sheet-like valve element having a portion with an opening therein adapted to be aligned with the conduit to permit flow through the conduit and another portion adapted to be aligned with the conduit to inhibit flow through the conduit and means for partially rolling up the valve element out of alignment with the conduit and thereby moving the valve element between positions in which said respective portions thereof are aligned with the conduit, the valve element being elongated in the direction of its movement between said positions and comprising a plurality of layers of material fastened together only at the ends thereof, the valve element being at all times disposed about said first mentioned means throughout a predetermined angle so that the paths of movement of the layers during movement of the valve element between said positions being such as to obviate any substantial tendency to stretch any layer relatively to any other layer.

5. A valve for controlling flow through a conduit comprising a flexible sheet-like valve element having a portion with an opening therein adapted to be aligned with the conduit to permit flow through the conduit and another portion adapted to be aligned with the conduit to inhibit flow through the conduit and means for partially rolling up the valve element out of alignment with the conduit and thereby moving the valve element between positions in which said respective portions thereof are aligned with the conduit, the valve element being elongated in the direction of its movement between said positions and comprising a plurality of layers of sheet metal fastened together only at the ends thereof.

6. A valve for controlling flow through a conduit comprising a flexible sheet-like valve element having a portion with an opening therein adapted to be aligned with the conduit to permit flow through the conduit and another portion adapted to be aligned with the conduit to inhibit flow through the conduit and means for partially rolling up the valve element out of alignment with the conduit and thereby moving the valve element between positions in which said respective portions thereof are aligned with the conduit, the vlave element being elongated in the direction of its movement between said positions and comprising a plurality of layers of stainless steel fastened together only at the ends thereof.

7. A valve for controlling flow through a conduit comprising a flexible sheet-like valve element having a portion with an opening therein adapted to be aligned with the conduit to permit flow through the conduit and another portion adapted to be aligned with the conduit to inhibit flow through the conduit and means for partially rolling up the valve element out of alignment with the conduit and thereby moving the valve element between positions in which said respective portions thereof are aligned with the conduit, the valve element being elongated in the direction of its movement between said positions and comprising a plurality of layers of stainless steel fastened together only at the ends thereof, the lengths of the paths of movement of the layers during movement of the valve element between said positions being in proportion to the distances of the respective paths from the axis about which the valve element is rolled up so as to obviate any substantial tendency to stretch any layer relatively to any other layer.

8. A valve for controlling flow through a conduit comprising a flexible sheet-like valve element having a portion with an opening therein adapted to be aligned with the conduit to permit flow through the conduit and another portion adapted to be aligned with the conduit to inhibit flow through the conduit, drums at opposite sides of the conduit on which the valve element is adapted to be rolled up whereby the valve element is moved between positions in which said respective portions thereof are aligned with the conduit and means for turning the drums continuously at the same speed in the same direction.

9. A valve for controlling flow through a conduit comprising a flexible sheet-like valve element having a portion with an opening therein adapted to be aligned with the conduit to permit flow through the conduit and another portion adapted to be aligned with the conduit to inhibit flow through the conduit and drums at opposite sides of the conduit on which the valve element is adapted to be rolled up whereby the valve element is moved between positions in which said respective portions thereof are aligned with the conduit, the diameter of the drums and the length of the valve element being so proportioned that the valve element in moving between the position in which the first mentioned portion thereof is aligned with the conduit and the position in which the second mentioned portion thereof is aligned with the conduit at no time extends about either drum a peripheral distance equal to the circumference of the drum.

10. A valve for controlling flow through a conduit comprising a casing closed except for connections with the conduit, a flexible sheet-like valve element in the casing having a portion with an opening therein adapted to be aligned with the conduit to permit flow through the conduit and another portion adapted to be aligned with the conduit to inhibit flow through the conduit and means for partially rolling up the valve element out of alignment with the conduit and thereby moving the valve element between positions in which said respective portions thereof are aligned with the conduit and sealing means connected with the conduit adapted to engage the valve element at the opposite faces thereof.

11. A valve for controlling flow through a conduit comprising a casing closed except for connections with the conduit, a flexible sheet-like valve element in the casing adjacent one of said connections, the valve element having a portion with an opening therein adapted to be aligned with the conduit to permit flow through the conduit and another portion adapted to be aligned with the conduit to inhibit flow through the conduit, means for partially rolling up the valve element out of alignment with the conduit and thereby moving the valve element between positions in which said respective portions thereof are aligned with the conduit, a sleeve defining a portion of the flow path mounted for movement into and out of contact with the valve element, peripherally closed guide means for the sleeve carried by the other of said connections with the conduit and flexible sealing means extending between the sleeve and the guide means inhibiting leakage therebetween.

References Cited in the file of this patent

UNITED STATES PATENTS

| | | |
|---|---|---|
| 825,277 | Rees | July 3, 1906 |
| 1,727,677 | Siebert | Sept. 10, 1929 |
| 2,504,013 | Ellis | Apr. 11, 1950 |
| 2,558,247 | Hamer | June 26, 1951 |
| 2,639,883 | Smith | May 26, 1953 |
| 2,695,155 | Westling | Nov. 23, 1954 |

FOREIGN PATENTS

| | | |
|---|---|---|
| 302,256 | Switzerland | Oct. 15, 1954 |